No. 663,659. Patented Dec. 11, 1900.
H. R. KENT.
SYSTEM OF ELECTRICAL DISTRIBUTION.
(Application filed May 1, 1900.)
(No Model.)
Fig. 1.
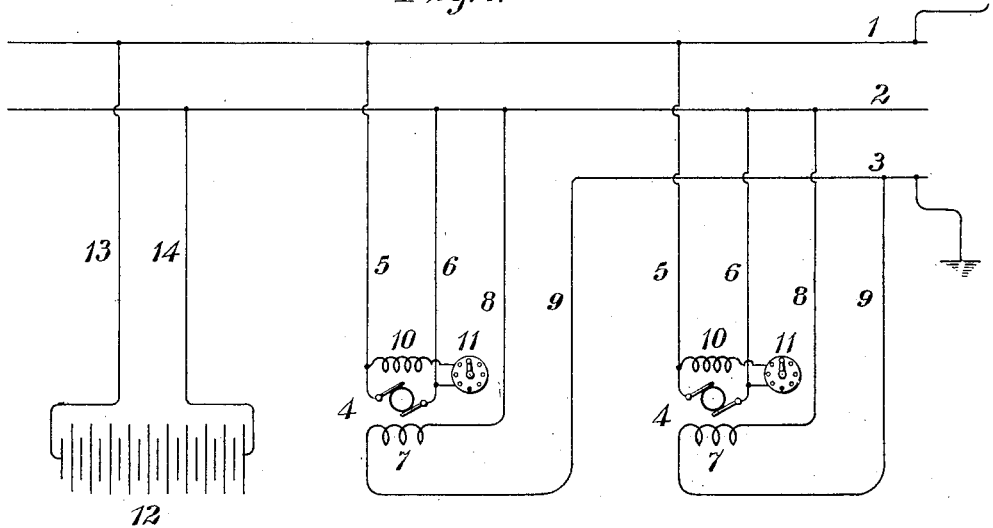
Fig. 2.
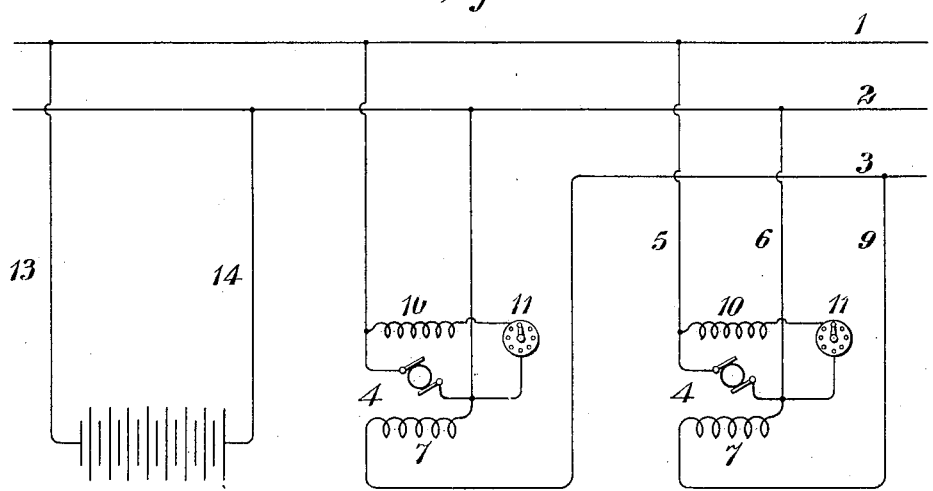
Fig. 3.
WITNESSES:
C. L. Belcher
Birney Hines
INVENTOR
Henry R. Kent
BY Wesley G. Carr
ATTORNEY.
THE NORRIS PETERS CO., PHOTO-LITHO., WASHINGTON, D. C.

UNITED STATES PATENT OFFICE.

HENRY R. KENT, OF NEW YORK, N. Y., ASSIGNOR TO THE WESTINGHOUSE MACHINE COMPANY, OF PENNSYLVANIA.

SYSTEM OF ELECTRICAL DISTRIBUTION.

SPECIFICATION forming part of Letters Patent No. 663,659, dated December 11, 1900.

Application filed May 1, 1900. Serial No. 15,078. (No model.)

*To all whom it may concern:*

Be it known that I, HENRY R. KENT, a citizen of the United States, residing at New York, in the county of New York and State of New York, have invented a new and useful Improvement in Systems of Electrical Distribution, of which the following is a specification.

My invention relates to systems of electrical distribution, and particularly to direct-current systems in which the translating devices are supplied in parallel by a secondary battery and one or more dynamos that are also connected in parallel to the distributing-conductors.

The object of my invention is to provide a system of the character above indicated in which the secondary battery and the generator or generators will severally automatically adjust themselves, so as to provide the desired amount of energy under varying conditions as regards the amount of load on the circuit.

In direct-current systems of distribution—such, for example, as electric-railway systems—the load upon the generators varies between widely-separated limits at different periods in the day, and in order to avoid providing dynamo-electric generators of sufficient power to supply the energy required by the maximum load it has been proposed to employ as an auxiliary source of power a secondary battery, the arrangement being such that the battery may be charged from the line when the load is light and may discharge into the line to aid the dynamos when the load is heavy.

It has been proposed prior to my invention to utilize a secondary battery or set of batteries in connection with shunt-wound dynamos for the purpose of supplementing the energy supplied by the dynamos when the load became excessive. It was assumed that the dynamos would provide the energy necessary for an average load and that the batteries would become charged when the load fell below the average. It was found in practice, however, that when the load became excessive the dynamos would fail to take their share of the load, in consequence of which the load thrown upon the battery was sufficient to endanger its life.

In order to correct the difficulties experienced in practice, as above specified, I have devised the apparatus shown in the accompanying drawings, in which—

Figure 1 is a diagram of a system of distribution embodying my invention. Fig. 2 is a view similar to Fig. 1, but involving a slight modification; and Fig. 3 is a diagram of a further modification.

Referring now to the details of circuits and apparatus shown in Fig. 1, the conductors 1, 2, and 3 may be assumed to be switchboard bus-bars from which the line conductors lead, the positive bus-bar 1 being connected in the case of an electric-railway circuit, for example, to the positive conductor, with which current-collecting devices engage, and the negative bus-bar 3 being connected to the negative conductor, here indicated as the earth. I have shown two compound-wound dynamos 4, the armatures of which are connected by means of conductors 5 and 6 to the bus-bars 1 and 2, and the series field-magnet windings 7, which are connected by means of conductors 8 and 9 to the bus-bars 2 and 3. Each shunt field-magnet winding 10 is connected between the conductors 5 and 6 in the usual manner and includes an adjustable rheostat 11 in order to vary the resistance of the shunt-circuit, as is usual in machines of this general character. The secondary battery 12 has its terminals connected to the bus-bars 1 and 2 by means of conductors 13 and 14.

In Fig. 2 the apparatus is the same in all respects as that shown in Fig. 1, except that the conductors 8 of Fig. 1 are omitted and the terminals of the field-magnet windings that in Fig. 1 are joined to the bus-bar 2 by means of conductor 8 are here joined to conductor 6.

It will be readily seen from the construction of apparatus and the arrangement of circuits shown and described that all of the line-current, whether supplied by dynamo or by battery, must traverse the field-magnet windings of the dynamos, and thus serve at all times to hold these machines up to their share of the work, whereas with the usual arrangement of circuits and circuit connections the battery-current would not traverse the field-magnet windings of the dynamo, and the machines would therefore fail in many cases to do their share of the work, this having been found to be the case in practice, as was hereinbefore stated.

In Fig. 3 I have shown an organization of apparatus and circuits by means of which the energy derived from the battery is utilized for the purpose of holding the dynamo or dynamos up to do its or their share of the work when the load is heavy. In this case only two bus-bars 1$^a$ and 2$^a$ are employed, and the field-magnet winding 7$^a$ is traversed by the battery-current only.

Any other modifications as regards the number of machines, the arrangement of circuits, &c., which may be made in order to obtain substantially the same result as that here set forth I regard as falling within the scope of my invention, and I therefore do not intend to limit my invention to what is specifically shown and described.

I claim as my invention—

1. In a system of electrical distribution, the combination of a secondary battery and a compound-wound dynamo-electric generator connected to operate in parallel and the series field-magnet winding of the generator being so connected as to be traversed by the entire current of the system.

2. In a system of electrical distribution, the combination with a secondary battery and one or more compound-wound dynamo-electric generators operating in parallel, of a bus-bar to which the positive terminals of the battery and the armature or armatures are connected, a second bus-bar to which one terminal of each series field-magnet winding is connected and an equalizing-bar to which the other terminal of each series field-magnet winding and the negative terminals of the battery and the armature or armatures are connected.

3. In a system of electrical distribution, the combination with a secondary battery and one or more compound-wound dynamo-electric generators, of a bus-bar to which one set of corresponding battery and armature terminals are connected, a second bus-bar to which the other set of corresponding battery and armature terminals and one terminal of each series field-magnet winding are connected and a third bus-bar to which the other series-winding terminals are connected.

4. In a system of direct-current distribution, the combination of a secondary battery and a dynamo-electric generator connected to operate in parallel, said generator having a field-magnet winding that is in series with its armature and also with the secondary battery.

5. In a system of direct-current distribution, the combination of a secondary battery and a plurality of dynamo-electric generators connected to supply translating devices in parallel, said generators having field-magnet windings so connected in circuit as to be traversed by the entire current of the system.

6. In a system of electrical distribution, the combination of a secondary battery and one or more dynamo-electric generators connected to operate in parallel, said generator or generators being severally provided with a field-magnet winding one terminal of which is connected to one pole of the battery, so that the entire battery-current traverses said winding or windings.

7. In a system of electrical distribution, the combination of a secondary battery and one or more dynamo-electric generators connected to operate in parallel, said generator or generators being severally provided with a shunt field-magnet winding and with a winding so connected in circuit as to be traversed by the battery-current.

In testimony whereof I have hereunto subscribed my name this 27th day of April, 1900.

HENRY R. KENT.

Witnesses:
W. L. MURRAY,
A. W. SEXTON, Jr.